(12) United States Patent
Gao

(10) Patent No.: US 12,036,682 B2
(45) Date of Patent: Jul. 16, 2024

(54) CALIBRATION SYSTEM COMPRISING AN END EFFECTOR WITH AN ADJUSTABLE MEMBER AND A MEASUREMENT INSTRUMENT FOR DETERMINING A LOCATION OF THE ADJUSTABLE MEMBER, AND A METHOD OF OPERATING THE SAME

(71) Applicant: GM Global Technology Operations LLC, Detroit, MI (US)

(72) Inventor: Dalong Gao, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 448 days.

(21) Appl. No.: 17/477,991

(22) Filed: Sep. 17, 2021

(65) Prior Publication Data

US 2023/0092863 A1 Mar. 23, 2023

(51) Int. Cl.
| | |
|---|---|
| *B25J 9/16* | (2006.01) |
| *B25J 9/00* | (2006.01) |
| *G01B 21/00* | (2006.01) |
| *G06F 18/22* | (2023.01) |
| *G06V 10/75* | (2022.01) |

(52) U.S. Cl.
CPC ........... *B25J 9/1692* (2013.01); *B25J 9/0096* (2013.01); *G01B 21/00* (2013.01); *G06F 18/22* (2023.01); *G06V 10/751* (2022.01)

(58) Field of Classification Search
None
See application file for complete search history.

(56) References Cited

U.S. PATENT DOCUMENTS

| | | | | |
|---|---|---|---|---|
| 11,082,621 B2 * | 8/2021 | Yoshida | ................... | G06T 7/73 |
| 11,090,810 B2 * | 8/2021 | Harada | ................. | B25J 9/1692 |
| 11,173,609 B2 * | 11/2021 | Lee | ........................ | B25J 9/0084 |
| 11,192,254 B2 * | 12/2021 | Oono | ..................... | B25J 9/1697 |
| 11,247,340 B2 * | 2/2022 | Hsu | ........................ | B25J 9/1697 |
| 2017/0157770 A1 * | 6/2017 | Lundberg | ............... | B25J 9/1692 |
| 2023/0255699 A1 * | 8/2023 | Ellman | ................. | A61B 34/30 |
| | | | | 700/245 |

\* cited by examiner

*Primary Examiner* — Raymond L Nimox
(74) *Attorney, Agent, or Firm* — Vivacqua Crane, PLLC

(57) ABSTRACT

A calibration system includes a docking stand fixed within a three-dimensional coordinate system and an end effector supported by the docking stand. The end effector includes a frame received by the docking stand and an adjustable member movable along the frame. The adjustable member includes a clamp and a reference surface. The calibration system includes a computational system including at least one processor and at least one non-transitory computer-readable medium including instructions. The calibration system includes a measurement instrument in electronic communication with the computational system. The measurement instrument is movable and is arranged to interact with the reference surface and transmit a signal to the processor. The processor is programmed to analyze a location of the measurement instrument within the three-dimensional coordinate system and the interaction between the measurement instrument and the reference surface to determine a location of the adjustable member within the three-dimensional coordinate system.

14 Claims, 8 Drawing Sheets

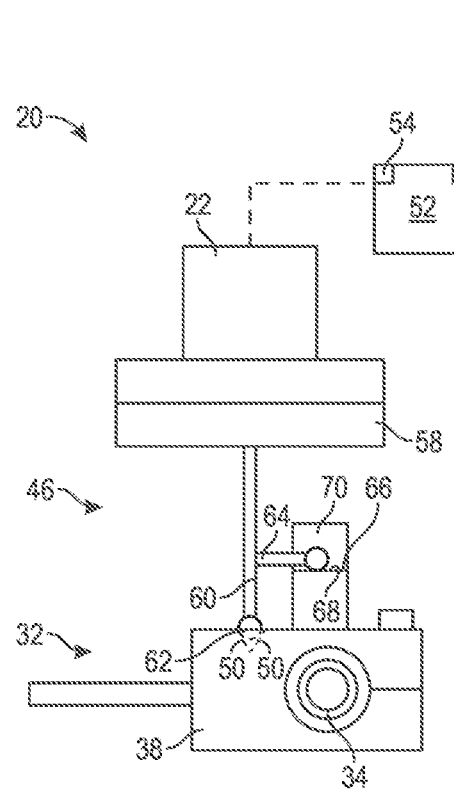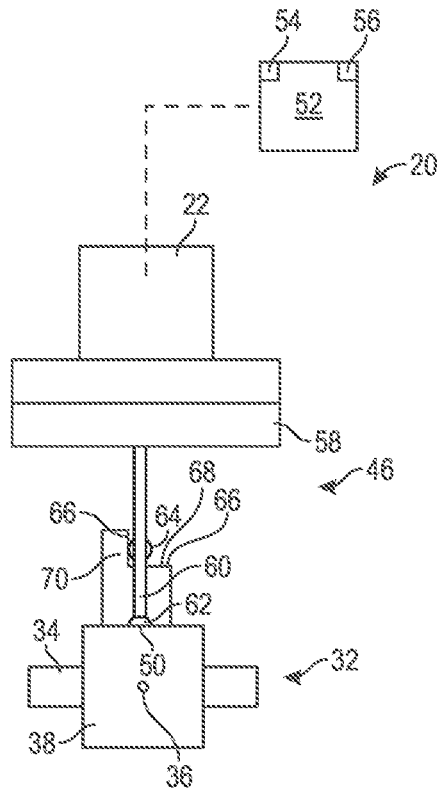
FIG. 7A  FIG. 7B
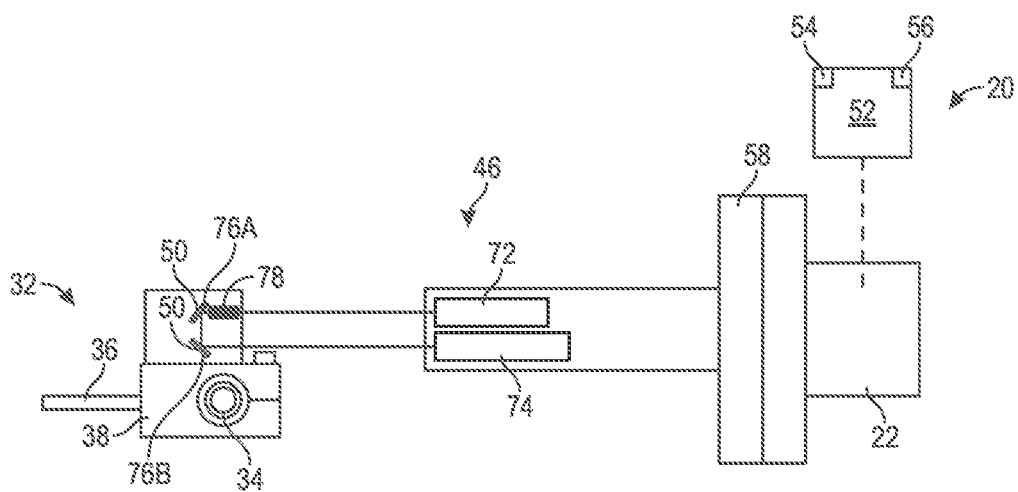
FIG. 8

CALIBRATION SYSTEM COMPRISING AN END EFFECTOR WITH AN ADJUSTABLE MEMBER AND A MEASUREMENT INSTRUMENT FOR DETERMINING A LOCATION OF THE ADJUSTABLE MEMBER, AND A METHOD OF OPERATING THE SAME

INTRODUCTION

The present disclosure relates to a calibration system for use with a robotic manipulator, and more particularly to a calibration system comprising an end effector with an adjustable member and a measurement instrument for determining a location of the adjustable member within the three-dimensional coordinate system. A method of operating the calibration system is also disclosed.

Robotic manipulators may be utilized in a variety of industries, including manufacturing. In the production of automotive vehicles, robotic manipulators may be utilized in any number of tasks, including moving components, assembling components, welding, and the like. End effectors are selectively connected to the distal end of the robotic manipulator. In one example, the end effector comprises a frame and adjustable arms movable relative to the frame to configure the end effector for use with numerous components.

The adjustable arms may be moved by the robotic manipulator. One problem that can occur is that the robotic manipulator may not know where the adjustable arm is located. This can be caused by the adjustable arm being moved relative to the frame without the storing the new location within a memory accessible to the robotic manipulator. When the robotic manipulator attempts to move the adjustable arm, the robotic manipulator moves to the last known location of the adjustable arm in the memory, rather than the actual location of the adjustable arm. Since the adjustable member is no longer in that stored location, the robotic manipulator may miss the clamp entirely or crash into a portion of the adjustable member, causing damage to the end effector and/or the robotic manipulator.

Thus, there is a need for a calibration system for use with a robotic manipulator that addresses these issues.

SUMMARY

According to several aspects of the present disclosure, a calibration system is used with a robotic manipulator. The calibration system comprises a docking stand fixed within a three-dimensional coordinate system and an end effector configured to be selectively connected to the robotic manipulator. The end effector is supported by the docking stand when disconnected from the robotic manipulator. The end effector comprises a frame received by the docking stand and fixed within the three-dimensional coordinate system and an adjustable member movable along the frame and within the three-dimensional coordinate system. The adjustable member comprises a clamp in engagement with the frame and configured to selectively fix the adjustable member to the frame, with the adjustable member comprising a reference surface. The calibration system further comprises a computational system comprising at least one processor and at least one non-transitory computer-readable medium including instructions and a measurement instrument in electronic communication with the computational system. The measurement instrument is movable within the three-dimensional coordinate system about the end effector and is arranged to interact with the reference surface and transmit a signal to the processor. The processor is programmed to analyze a location of the measurement instrument within the three-dimensional coordinate system and the interaction between the measurement instrument and the reference surface to determine a location of the adjustable member within the three-dimensional coordinate system.

In one aspect, the processor is programmed to compare the location to a stored location of the reference surface in the non-transitory computer-readable medium to determine if the adjustable member is properly positioned relative to the frame.

In another aspect, the processor is programmed to save the location into the non-transitory computer-readable medium as a stored location.

In another aspect, the reference surface is located on the clamp of the adjustable member.

In another aspect, the measurement instrument comprises a vision system arranged to interact with the reference surface by collecting at least one image of the reference surface and transmit the signal with the image to the processor.

In another aspect, the processor is programmed to analyze the image in comparison to one or more stored images of the reference surface saved within the non-transitory computer-readable medium and identify differences between the image and the stored images due to differences in the location of the vision system when the image and the stored images were taken.

In another aspect, the reference surface comprises a fiducial marker discernible by the vision system and providing references by which the processor can compare the image to the stored images.

In another aspect, the fiducial marker is a head of a fastener.

In another aspect, the fiducial marker is a QR code.

According to several aspects of the present disclosure, a robotic system comprises a robotic manipulator comprising a plurality of links and joints and extending to a distal end and a calibration system. The calibration system comprises a docking stand fixed within a three-dimensional coordinate system and an end effector configured to be selectively connected to the distal end of the robotic manipulator. The end effector is supported by the docking stand when disconnected from the robotic manipulator. The end effector comprises a frame received by the docking stand and fixed within the three-dimensional coordinate system and an adjustable member movable along the frame and within the three-dimensional coordinate system. The adjustable member comprises a clamp in engagement with the frame to selectively fix the adjustable member to the frame. The adjustable member comprises a reference surface. The calibration system further comprises a computational system comprising at least one processor and at least one non-transitory computer-readable medium including instructions and a measurement instrument in electronic communication with the computational system. The measurement instrument is movable within the three-dimensional coordinate system about the end effector and is arranged to interact with the reference surface and transmit a signal to the processor. The processor is programmed to analyze a location of the measurement instrument within the three-dimensional coordinate system and the interaction between the measurement instrument and the reference surface to determine a location of the adjustable member within the three-dimensional coordinate system.

In one aspect, the measurement instrument is coupled to the distal end of the robotic manipulator, with the plurality of links and joints arranged to support the measurement instrument and facilitate movement of the measurement instrument within the three-dimensional coordinate system about the end effector.

According to several aspects of the present disclosure, a method of operating a calibration system for use with a robotic manipulator is described. The calibration system comprises a docking stand and an end effector supported by the docking stand. The end effector comprises a frame received by the docking stand and an adjustable member movable along the frame. The calibration system comprises a computational system comprising at least one processor and at least one non-transitory computer-readable medium including instructions. The calibration system comprises a measurement instrument in electronic communication with the computational system. The method comprises moving the measurement instrument within a three-dimensional coordinate system about the end effector, interacting the measurement instrument with a reference surface of the adjustable member, and transmitting a signal from the measurement instrument to the processor. The method further comprises analyzing a location of the measurement instrument within the three-dimensional coordinate system and the interaction between the measurement instrument and the reference surface with the processor and determining a location of the adjustable member within the three-dimensional coordinate system.

In one aspect, the method further comprises comparing the location to a stored location of the reference surface in the non-transitory computer-readable medium and determining a distance between the location and the stored location in the three-dimensional coordinate system.

In another aspect, the method further comprises moving the adjustable member the distance to position the adjustable member in the stored location.

In another aspect, the method further comprises saving the location into the non-transitory computer-readable medium as a stored location.

In another aspect, the measurement instrument comprises a vision system. Interacting the measurement instrument with the reference surface of the adjustable member is further defined as collecting at least one image of the reference surface with the vision system.

In another aspect, analyzing the location of the measurement instrument within the three-dimensional coordinate system and the interaction between the measurement instrument and the reference surface with the processor is further defined as analyzing the image in comparison to one or more stored images of the reference surface saved within the non-transitory computer-readable medium and identifying differences between the image and the stored images due to differences in the location of the vision system when the image and the stored images were taken.

In another aspect, the measurement instrument comprises a probe. Interacting the measurement instrument with the reference surface of the adjustable member is further defined as contacting the probe of the measurement instrument with the reference surface of the adjustable member.

In another aspect, the measurement instrument comprises an illumination device and a light sensor and the reference surface is further defined as a mirror. Interacting the measurement instrument with the reference surface of the adjustable member is further defined as emitting light from the illumination device toward the mirror and reflecting the light back to the light sensor with the mirror.

In another aspect, the adjustable member further comprises a tube having a bore aligned with the mirror. Emitting light from the illumination device toward the mirror is further defined as emitting light from the illumination device through the tube and toward the mirror when the light is axially aligned with the bore of the tube.

In another aspect, the robotic manipulator comprises a plurality of links and joints and extends to a distal end, with the measurement instrument coupled to the distal end of the robotic manipulator. Moving the measurement instrument within the three-dimensional coordinate system about the end effector is further defined as moving the measurement instrument within the three-dimensional coordinate system about the end effector by moving the plurality of links and joints of the robotic manipulator.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 7A is a schematic side view of the measurement instrument of FIG. 5A, with the first and second probes contacting the clamp.

FIG. 7B is a schematic top view of the measurement instrument of FIG. 5A, with the first and second probes contacting the clamp.

FIG. 8 is a schematic view of another example of a measurement instrument comprising an illumination device and a light sensor, with the illumination device emitting light toward the clamp and the clamp reflecting the light back to the light sensor.

DETAILED DESCRIPTION

The following description is merely exemplary in nature and is not intended to limit the present disclosure, application, or uses.

Figure 1:
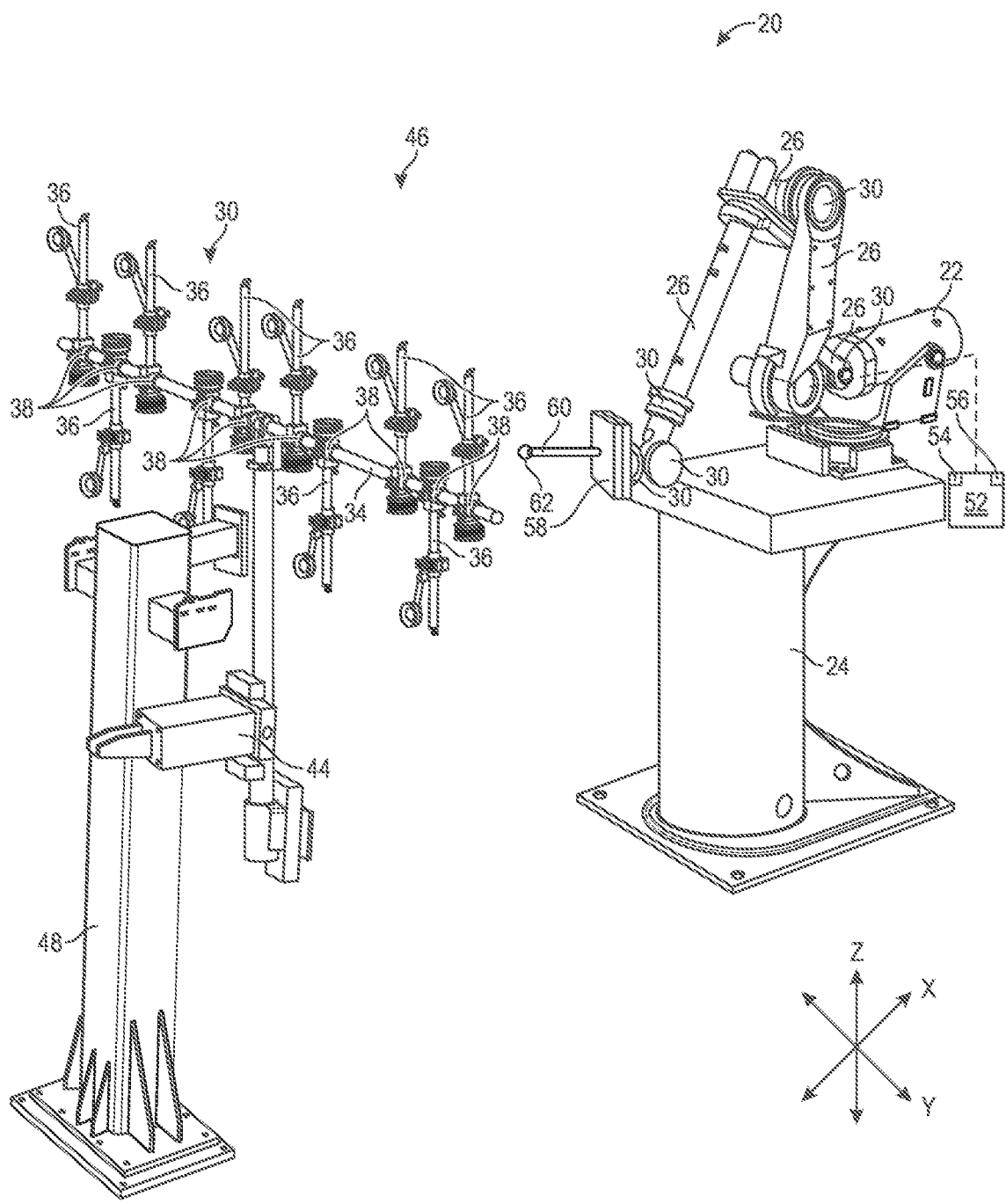
FIG. 1 is a perspective view of a robotic system comprising a robotic manipulator, and a calibration system comprising an end effector and a measurement instrument.

Referring to FIG. 1, according to several aspects of the present disclosure, a robotic system is shown generally at 20. The robotic system 20 comprises a robotic manipulator 22. The robotic manipulator 22 has a base 24 and a plurality of links 26 extending to a distal end 28. The links 26 collectively form one or more arms of the robotic manipulator 22. The robotic manipulator 22 may have a serial arm configuration (as shown in FIG. 1) or a parallel arm configuration. The robotic manipulator 22 may comprise a plurality of joints 30 and a plurality of motor and/or joint encoders (not shown) located at the joints 30 for determining position data of the joints 30. The robotic manipulator 22 according to one example has six joints 30 implementing at least six degrees of freedom for the robotic manipulator 22. However, the robotic manipulator 22 may have any number of degrees of freedom and may have any suitable number of joints and redundant joints.

The robotic manipulator 22 may be utilized in a variety of industries. In one example, the robotic manipulator 22 is used in manufacturing. More specifically, the robotic manipulator 22 is used in the production of automotive vehicles. In the production of automotive vehicles, the robotic manipulator 22 may be utilized in any number of tasks, including moving components, assembling components, welding, and the like.

Figure 2:
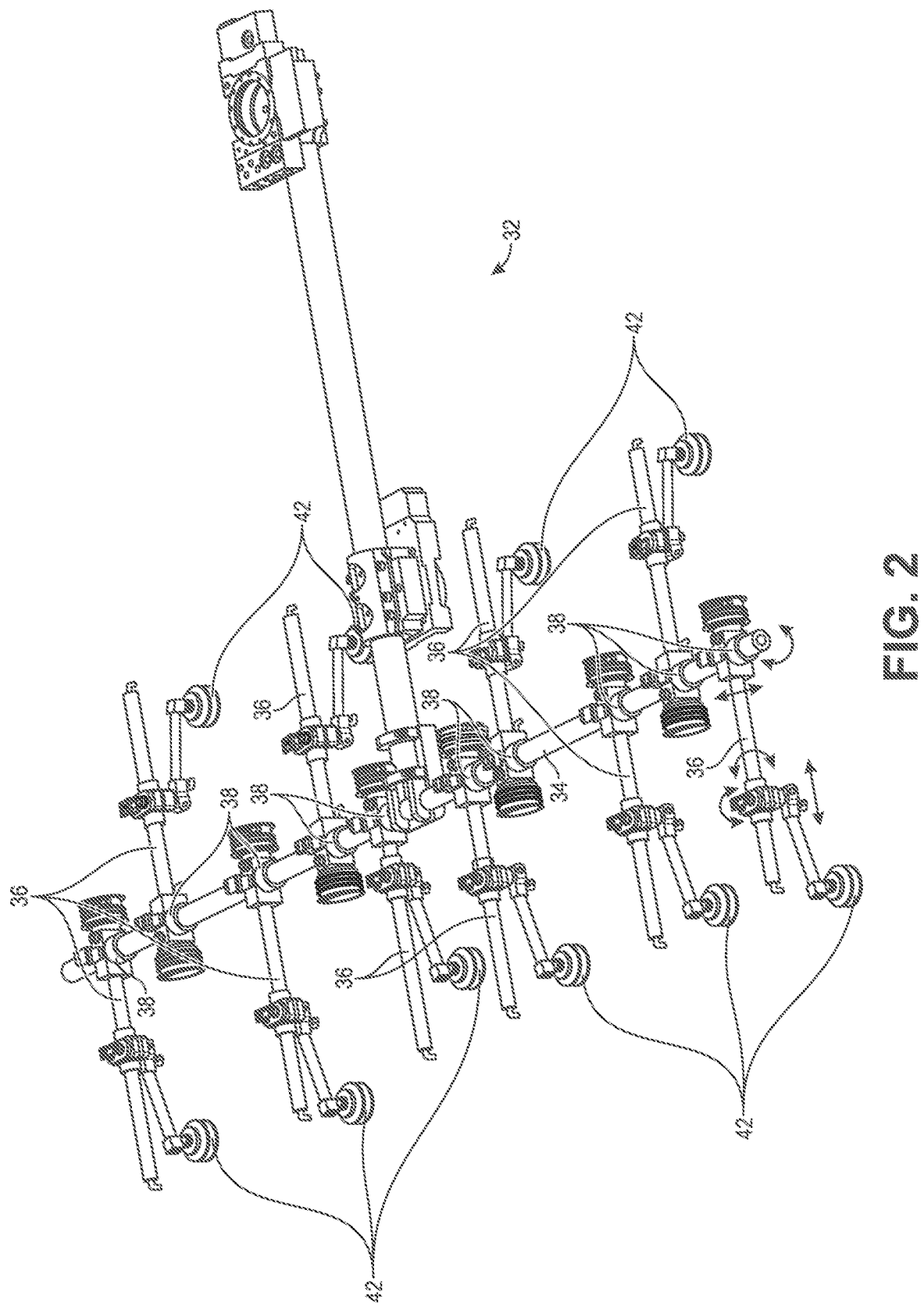
FIG. 2 is a perspective view of the end effector of FIG. 1.

The robotic system 20 may further comprise an end effector 32 configured to be selectively connected to the distal end 28 of the robotic manipulator 22. In one example, the end effector 32 comprises a frame 34 and an adjustable member 36 movable along the frame 34 and within a three-dimensional coordinate system. The three-dimensional coordinate system comprises an x-axis, a y-axis, and a z-axis each orthogonal to one another. Movement along the x, y, and z-axes and rotation about the x, y, and z-axes define the aforementioned six degrees of freedom. The adjustable member 36 may be movable along or about one, or a combination, of the x, y, and z-axis. The adjustable member 36 further comprises a clamp 38 in engagement with the frame 34 to selectively fix the adjustable member 36 to the frame 34. As shown in FIG. 2, the frame 34 is comprised of at least one tube, with the clamp 38 configured to surround and compress against the tube to fix the clamp 38 to the tube. The adjustable member 36 is configured to rotate about and move linearly along the tube.

Although one adjustable member 36 is described herein, the end effector 32 may comprise any number of adjustable members 36, as shown in FIG. 2. Each of the adjustable members 36 may be independently movable relative to the frame 34. In the example shown in FIG. 2, each of the adjustable members 36 comprises a suction cup 42. The suction cups 42 are configured to form a vacuum against a component (such as a body panel), retaining the component to the end effector 32 and allowing the robotic manipulator 22 to move and manipulate the component. It is advantageous to facilitate the use of the end effector 32 with components of varying shape, size, and configuration in order to reduce the number of end effectors 32 that must be utilized by the robotic manipulator 22. More specifically, reducing the number of end effectors 32 reduces the capital cost realized with each end effector 32 and reduces the surface area and volume that is required for storing the end effectors 32. Therefore, the adjustable members 36 allow the end effector 32 to be converted for use with many different components. For example, the adjustable members 36 may be moved to position the suction cups 42 into locations and orientations for use with a specific shape of a body panel. The adjustable members 36 may then be moved again to reposition the adjustable members 36 for use with a specific shape of another body panel.

The adjustable member 36 may be moved by the robotic manipulator 22. In one example, the robotic manipulator 22 connects to a nut runner 44 (shown on a docking stand 48 in FIG. 1) at the distal end 28. The nut runner 44 is configured to engage the clamp 38, loosen the clamp 38, move the adjustable member 36 relative to the frame 34, and retighten the clamp 38. The robotic manipulator 22 moves the nut runner 44 to facilitate the interaction between the nut runner 44 and the clamp 38. Alternatively, an operator may manually move the adjustable member 36.

One problem that can occur is that the robotic manipulator 22 may not know where the adjustable member 36 is located. This can be caused by the adjustable member 36 being moved relative to the frame 34 without the storing the new location within a memory accessible to the robotic manipulator 22. When the robotic manipulator 22 attempts to move the adjustable member 36, the robotic manipulator 22 moves the nut runner 44 to the last known location of the clamp 38 stored in the memory, rather than the actual location of the clamp 38. Since the adjustable member 36 is no longer in that stored location, the robotic manipulator 22 may miss the clamp 38 entirely or crash into another portion of the adjustable member 36, causing damage to the end effector 32, nut runner 44, and/or the robotic manipulator 22.

To this end, a calibration system 46 is disclosed herein and shown in FIG. 1. The calibration system 46 comprises the docking stand 48 fixed within the three-dimensional coordinate system and the end effector 32 supported by the docking stand 48 when disconnected from the robotic manipulator 22. The end effector 32 comprises the frame 34 received by the docking stand 48 and fixed within the three-dimensional coordinate system and the adjustable member 36 comprising a reference surface 50. The calibration system 46 further comprises a computational system 52 comprising at least one processor 54 and at least one non-transitory computer-readable medium 56 including instructions and a measurement instrument 58 in electronic communication with the computational system 52. The measurement instrument 58 is movable within the three-dimensional coordinate system about the end effector 32 and is arranged to interact with the reference surface 50 and transmit a signal to the processor 54. The processor 54 is programmed to analyze a location of the measurement instrument 58 within the three-dimensional coordinate system and the interaction between the measurement instrument 58 and the reference surface 50 to determine a location of the adjustable member 36 within the three-dimensional coordinate system.

In the examples shown in the Figures, the measurement instrument 58 is coupled to the distal end 28 of the robotic manipulator 22, with the plurality of links 26 and joints 30 arranged to support the measurement instrument 58 and facilitate movement of the measurement instrument 58 within the three-dimensional coordinate system about the end effector 32. More specifically, movement of the robotic manipulator 22 moves the measurement instrument 58. The robotic manipulator 22 is in electronic communication with the processor 54, such that the processor 54 may dictate the movement of the robotic manipulator 22 to facilitate interaction between the measurement instrument 58 and the reference surface 50. In other examples (not shown in the Figures), an operator may move and interact the measurement instrument 58 with the reference surface 50.

The location of the measurement instrument 58 within the three-dimensional coordinate system is defined as the position of the measurement instrument 58 along and about the x, y, and z-axes. As such, the measurement instrument 58 is moveable within six degrees of freedom.

In one example, the processor 54 is programmed to compare the location to a stored location of the reference surface 50 in the non-transitory computer-readable medium 56 to determine if the adjustable member 36 is properly positioned relative to the frame 34, referred to as a verification process. During the verification process, the robotic manipulator 22 moves the measurement instrument 58 within the six degrees of freedom. The measurement instrument 58 moves to the stored location for interaction with the reference surface 50. If the measurement instrument 58 is incapable of interacting with the reference surface 50 at the stored location (because the adjustment member has been moved), the robotic manipulator 22 may move the measurement instrument 58 within a grid pattern in an attempt to find the reference surface 50. Alternatively, an operator may direct the movement of the measurement instrument 58 to interact with the reference surface 50. In one example, the operator directs the movement of the measurement instrument 58 by moving the robotic manipulator 22. In another example, the operator directs the movement of the measurement instrument 58 by moving the measurement instrument 58 itself.

In one example, the processor 54 is programmed to save the location into the non-transitory computer-readable medium 56 as a stored location, referred to as a recording process. More specifically, when the location of the adjustable member 36 is different than the previous stored location saved in the non-transitory computer-readable medium 56, the processor 54 may save the location as the stored location. The stored location may overwrite the previous stored location in the non-transitory computer-readable medium 56. Alternatively, the stored location may be one of numerous stored locations saved in the non-transitory computer-readable medium 56.

The reference surface 50 may be located on the clamp 38 of the adjustable member 36, as shown in FIGS. 3-10. More specifically, the location of the reference surface 50 on the clamp 38 within the six degrees of freedom may be stored within the non-transitory computer-readable medium 56. Likewise, other components of the adjustable member 36 may be fixed relative to the clamp 38 and the reference surface 50. As such, the interaction of the measurement instrument 58 with the reference surface 50 allows the processor 54 to ascertain the location of the reference surface 50 within the six degrees of freedom. The processor 54 may then ascertain the location of the other fixed components of the adjustable member 36. Furthermore, the clamp 38 provides a direct connection to the frame 34. As such, movement of the adjustable member 36 along or about the frame 34 results in movement of the reference surface 50. It is to be appreciated that the reference surface 50 may be located on any suitable portion of the adjustable member 36.

Figure 3:
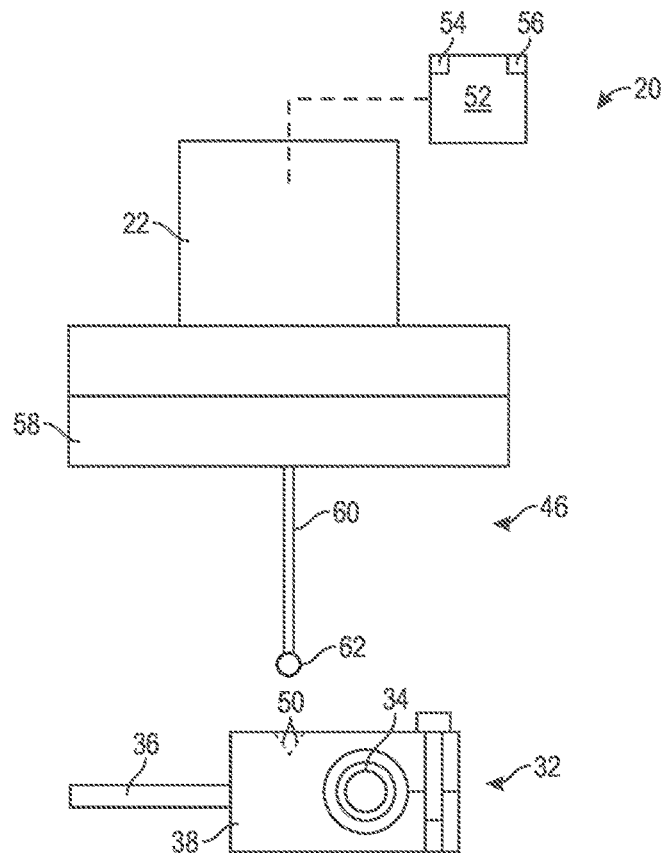
FIG. 3 is a schematic view of one example of a measurement instrument comprising a probe, with the probe spaced from a clamp of the end effector.
Figure 4:
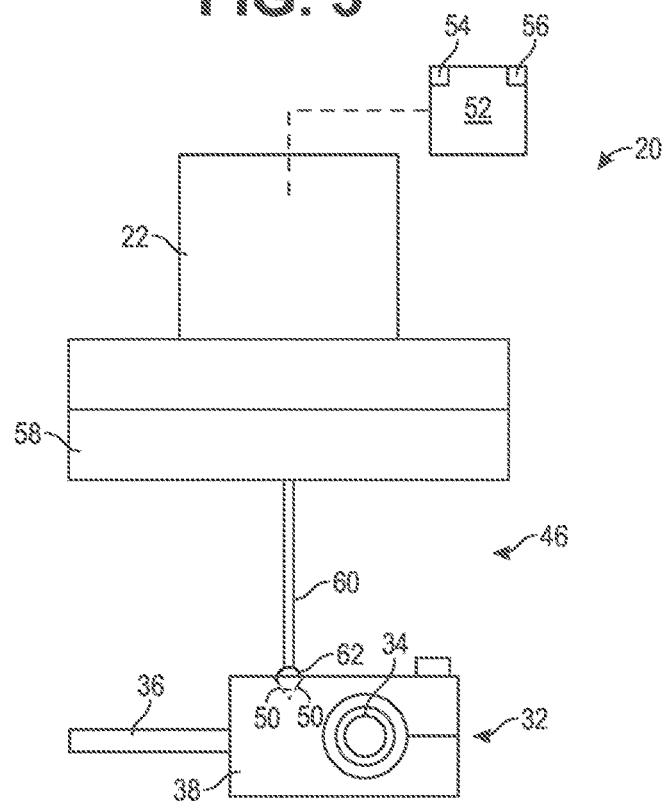
FIG. 4 is a schematic view of the measurement instrument of FIG. 3, with the probe contacting the clamp.
Figure 5A:
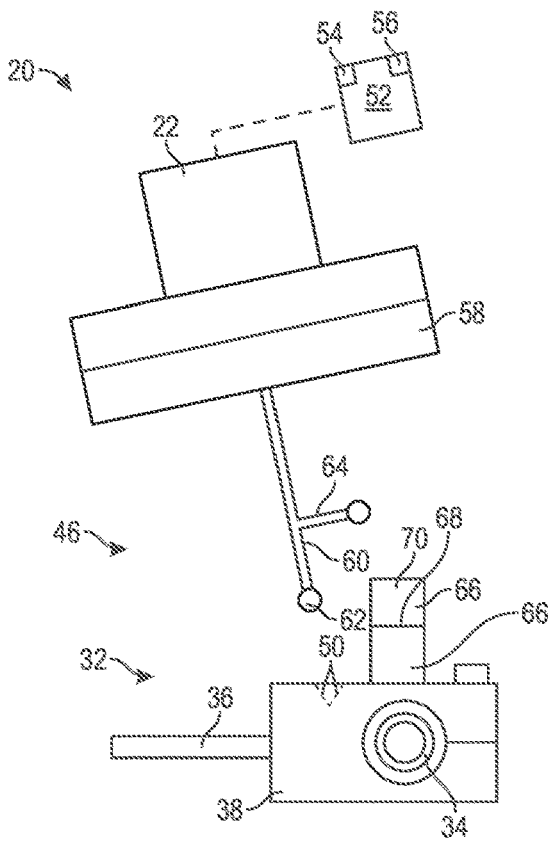
FIG. 5A is a schematic side view of another example of a measurement instrument comprising a first probe and a second probe, with the first and second probes spaced from a clamp of the end effector.
Figure 5B:
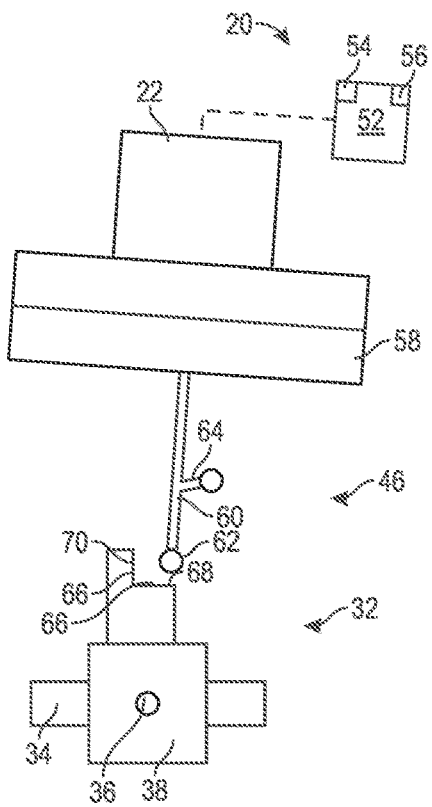
FIG. 5B is a schematic top view of the measurement instrument of FIG. 5A, with the first and second probes spaced from a clamp of the end effector.
Figure 6A:
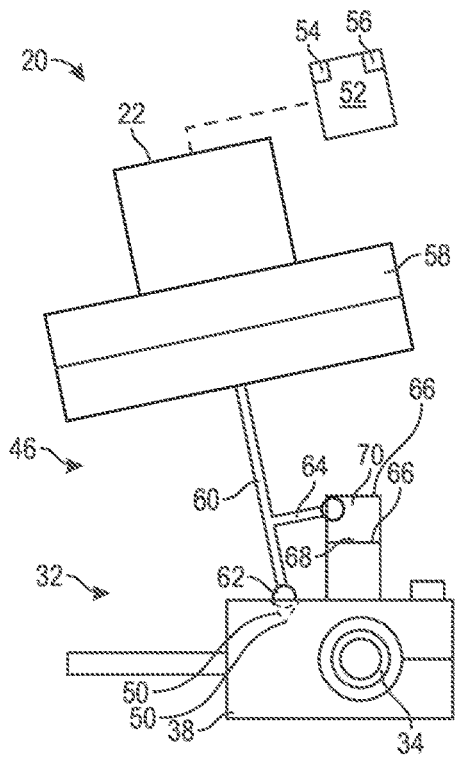
FIG. 6A is a schematic side view of the measurement instrument of FIG. 5A, with the first probe contacting the clamp.
Figure 6B:
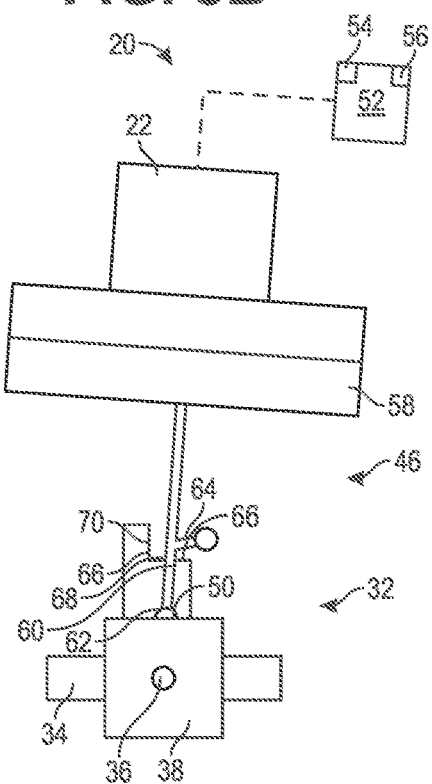
FIG. 6B is a schematic top view of the measurement instrument of FIG. 5A, with the first probe contacting the clamp.

As shown in FIGS. 3 and 4, the measurement instrument 58 may comprise a probe 60 arranged to contact the reference surface 50. In one example, the probe 60 comprises a tip 62 having a spherical configuration and the reference surface 50 has an inverted conical configuration for receiving the tip 62. The location of the measurement instrument 58 is further defined as the center of the tip 62. The size and shape of the tip 62 and the cone are arranged such that the tip 62 seats in the cone in one position, as shown in FIG. 4. As such, when the tip 62 is placed in the cone (i.e., the interaction between the measurement instrument 58 and the reference surface 50), the tip 62 seats and the processor 54 obtains the signal detailing the location of the tip 62. The processor 54 then analyzes the location of the measurement instrument 58 within the three-dimensional coordinate system in view of dimensional characteristics of the adjustable member 36 and the reference surface 50 stored within the non-transitory computer-readable medium 56, from which the processor 54 determines the location of the adjustable member 36 within the three-dimensional coordinate system.

In one example, the probe 60 is further defined as a first probe 60 and the reference surface 50 is further defined as a first reference surface 50 as shown in FIGS. 5A-7B. The measurement instrument 58 further comprises a second probe 64 extending transverse to the first probe 60 and the adjustable member 36 further comprises a second reference surface 66 spaced from the first reference surface 50. The first probe 60 is arranged to contact the first reference surface 50 and the second probe 64 is arranged to contact the second reference surface 66. More specifically, the second probe 64 is orthogonal to the first probe 60. The first reference surface 50 has the cone configuration described above. The second reference surface 66 has a first portion 68 and a second portion 70 arranged in an orthogonal configuration. The second reference surface 66 is disposed above the first reference surface 50. The second reference surface 66 is spaced from the first reference surface 50 a distance such that the second probe 64 touches the first portion 68 of the second reference surface 66 when the first probe 60 is seated in the first reference surface 50 and the first probe 60 is axially aligned with the cone, as shown in FIGS. 7A and 7B. The second probe 64 touches the second portion 70 of the second reference surface 66 when the second probe 64 rotates axially about the first probe 60. The first and second probes 60, 64 may be utilized during the recording process to locate the measurement instrument 58 relative to the six degrees of freedom. To utilize the first and second probes 60, 64 in the recording process, the measurement instrument 58 is moved until the first probe 60 seats within the first reference surface 50. The measurement instrument 58 is then rotated about the tip 62 of the first probe 60 (i.e., the tip 62 acts as the center of rotation). The measurement instrument 58 is rotated until the second probe 64 touches both of the first and second portions 68, 70 of the second reference surface 66. The contact of the first and second probes 60, 64 with the first and second reference surfaces 50, 66 establishes the location (along and about the x, y, and z-axes) of the measurement instrument 58 relative to the adjustable member 36.

The measurement instrument 58 may comprise an illumination device 72 and a light sensor 74, as shown in FIG. 8. The reference surface 50 may be further defined as a mirror 76. The illumination device 72 is arranged to interact with the mirror 76 by emitting light toward the mirror 76 and the mirror 76 reflecting the light back to the light sensor 74. The measurement instrument 58 is arranged to transmit the signal to the processor 54 when the light is received by the light sensor 74. The characteristics of the reflected light received by the light sensor 74 correspond to the location of the measurement instrument 58 relative to the adjustable member 36. In one example, the adjustable member 36 further comprises a tube 78 having a bore aligned with the mirror 76, with the tube 78 arranged to transmit the light from the illumination device 72 to the mirror 76 when the light is axially aligned with the bore of the tube 78. The mirror 76 is further defined as a first mirror 76A and the adjustable member 36 further comprises a second mirror 76B, with first and second mirrors 76A, 76B aligned orthogonally, and with the mirrors 76A, 76B collectively configured to reflect the light back to the measurement instrument 58 parallel to the light emitted by the illumination device 72. The location of the measurement instrument 58 may be based off a point on the illumination device 72 at the center of the emitted light. The point references the center of rotation of the illumination device 72 (i.e., rotation of the measurement instrument 58 about the point does not translate the beam of light). More specifically, the illumination device 72 may collimate the light through the use of a laser, a collimating lens, or the like. Furthermore, the light emitted by the illumination device 72 may be part of the visible spectrum (e.g., white light) and/or non-visible spectrum (e.g., infrared light). The tube 78 is sized to permit the collimated light therethrough. The collimated light transmits through the tube 78 when the measurement instrument 58 is rotationally oriented and translationally positioned to be axially aligned with the bore of the tube 78 (i.e., two of the three rotational degrees of freedom and two of the three translational degrees of freedom). The collimated light is received by the light sensor 74 when the measurement instrument 58 is rotationally oriented to align with the light reflected from the second mirror 76B (i.e., the third rotational degree of freedom). As such, when the measurement instrument 58 interacts with the mirrors 76A, 76B, the location of the adjustable member 36 relative to the measurement instrument 58 is known by the processor 54 within five of the six degrees of freedom: more specifically, every degree of freedom except the translational degree of freedom along the axis of the bore of the tube 78. As such, the distance between the measurement instrument 58 and the adjustable member 36 along the axis of the bore of the tube 78 is unknown.

To determine the location of the adjustable member 36 relative to the measurement instrument 58 within all six degrees of freedom, the measurement instrument 58 may comprise a second light sensor (not shown) configured to receive light reflected from the adjustable member 36 at an angle transverse to the light reflected to the original light sensor 74 (further defined as the first light sensor 74). The second light sensor sends a signal to the processor 54 with the location of the adjustable member 36 relative to the measurement instrument 58 within five of the six degrees of freedom that are offset from the degrees of freedom in the signal from the first light sensor 74. The processor 54 then analyzes the location of the adjustable member 36 relative to the measurement instrument 58 from the first and second sensors and utilizes the offset to ascertain the location of the adjustable member 36 along the sixth degree of freedom.

To reflect light to the second light sensor, the measurement instrument 58 may comprise a second illumination device (not shown) corresponding to the second light sensor and a second reference surface (not shown) configured to receive the light from the second illumination device and reflect the light back to the second light sensor. Alternatively, the first mirror 76A of the reference surface 50 may be a pellicle mirror (not shown) configured to split the light received from the illumination device 72 into a first light branch and a second light branch, transverse to the first light branch. The first light branch reflects off the second mirror 76B toward the first light sensor 74. The reference surface 50 may comprise a third mirror (not shown) spaced from the second mirror 76B. The second light branch reflects off the third mirror toward the second light sensor.

Figure 9:
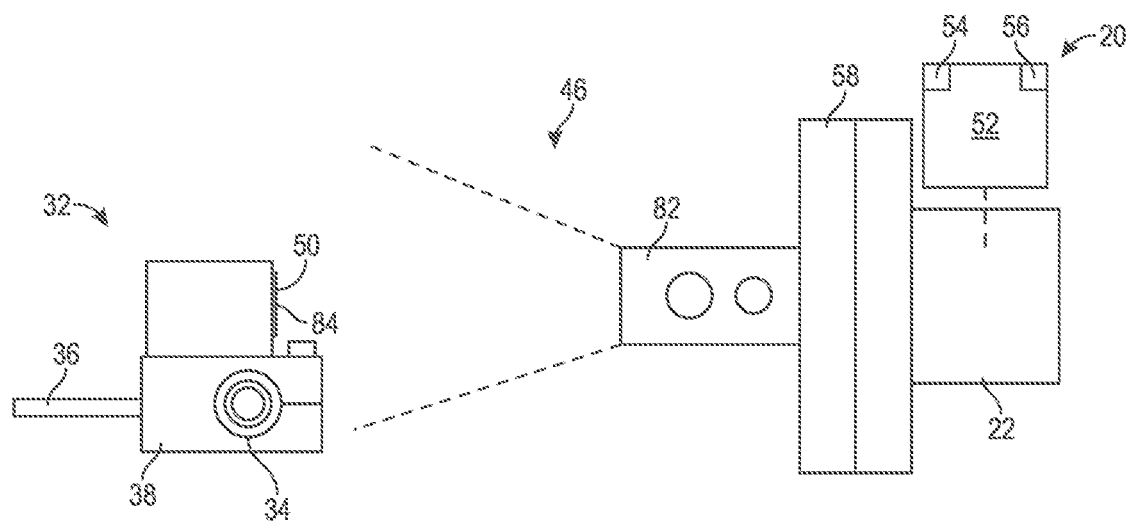
FIG. 9 is a schematic view of another example of a measurement instrument comprising a vision system, with the vision system taking an image of the clamp.

The measurement instrument 58 may comprise a vision system 82 arranged to interact with the reference surface 50 by collecting at least one image of the reference surface 50 and transmitting the signal with the image to the processor 54, as shown in FIG. 9. The processor 54 analyzes the image in comparison to one or more stored images of the reference surface 50 saved within the non-transitory computer-readable medium 56. The processor 54 identifies differences between the image and the stored images due to differences in the location of the vision system 82 when the image and the stored images were taken. The characteristics include shape, size, orientation, distortion, the two-dimensional location of the reference surface 50 in the image, etc. The location of the vision system 82 is known and corresponds to the point from which the image is taken (such as a center of a lens of the vision system 82). From the location of the vision system 82 and the differences in characteristics between the image and stored images, the processor 54 determines the location of the adjustable arm.

Figure 10:
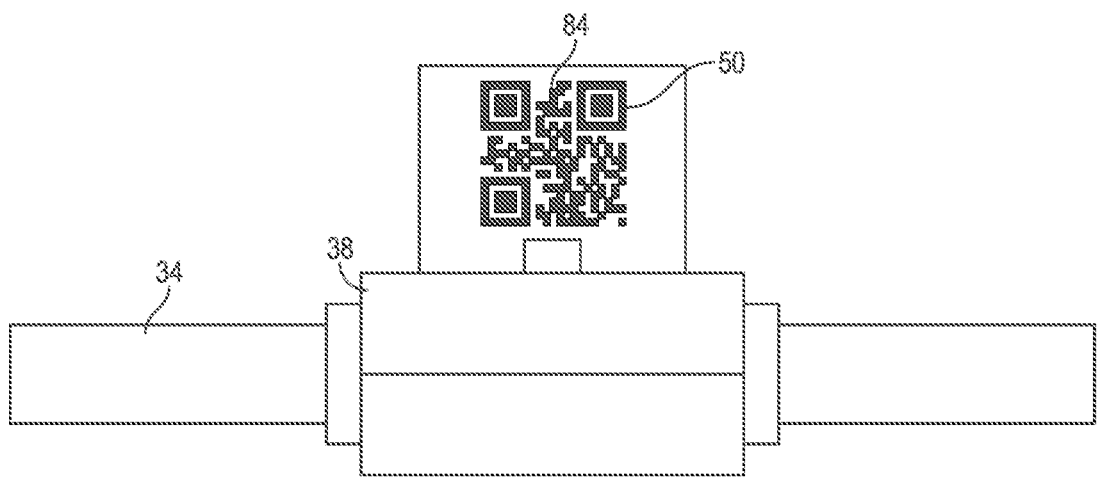
FIG. 10 is a schematic view of the clamp of FIG. 9, showing a fiducial marker.
Figure 11:
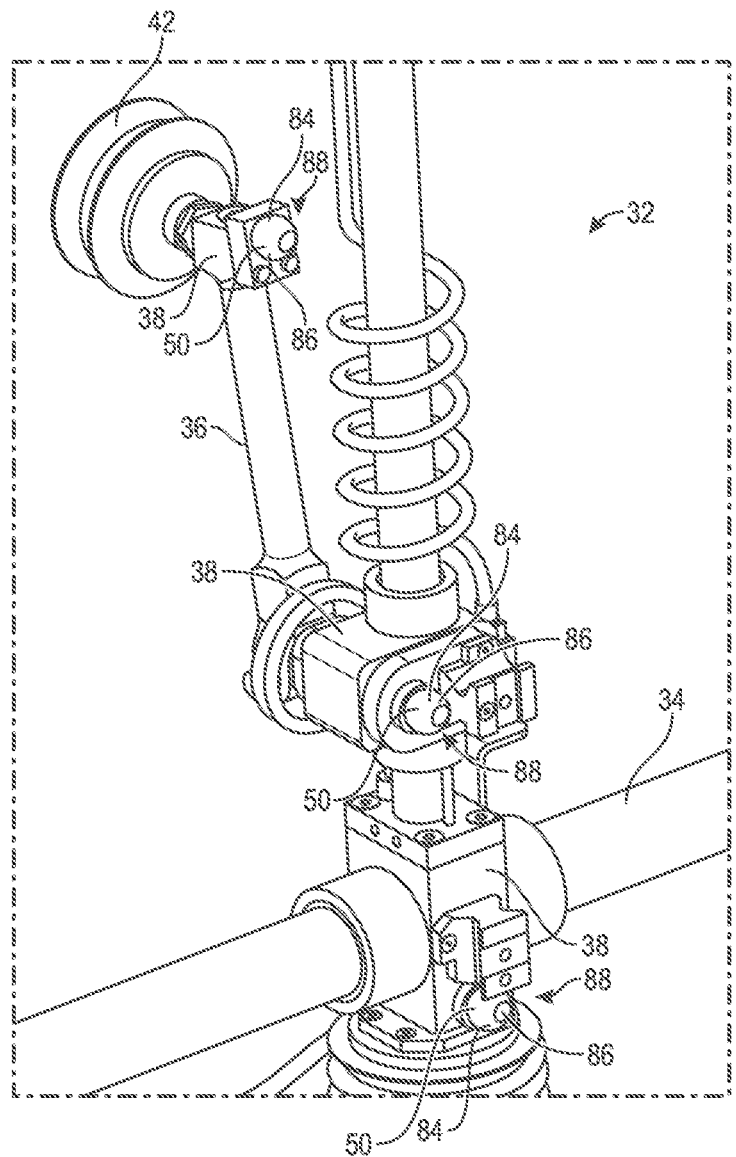
FIG. 11 is a perspective view of another example of the end effector, showing the fiducial marker configured as a head of a fastener.

In one example, the reference surface 50 comprises a fiducial marker 84. The fiducial marker 84 may comprise numerous edges of contrasting colors (such as black and white) in unique patterns and formations that are discernible by the vision system 82 and provide references by which the processor 54 can compare the image to the stored images. The fiducial marker 84 may include a QR code, as shown in FIG. 10. Alternatively, the fiducial marker 84 may include a barcode. In yet another example, the fiducial marker 84 is a head 86 of a fastener 88. The heads 86 of three fasteners 88 are shown in FIG. 11. The fasteners 88 are utilized to fix components of the end effector 32 together. More specifically, one of the fasteners 88 is utilized with the clamp 38 to couple together the adjustable member 36 and the frame 34. The other fasteners 88 are utilized to couple together components of the adjustable member 36. The vision system 82 may reference any one of (or all of) the heads 86 of the fasteners 88 to determine the location of the adjustable member 36. In the example shown in FIG. 11, the heads 86 have hemi-spherical configurations; however, the heads 86 may have any suitable configuration. It is to be appreciated that the reference surface 50 may have any suitable configuration that can be imaged by the vision system 82.

Figure 12:
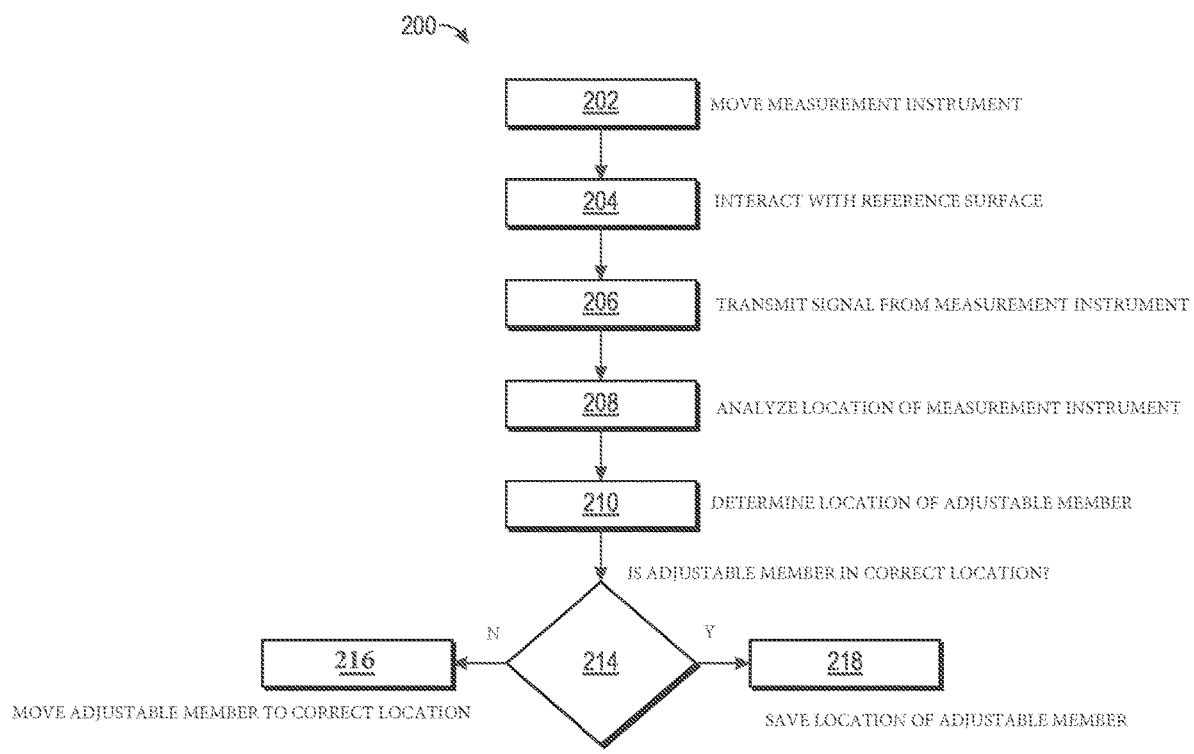
FIG. 12 is a flow chart of one example of a method of operating the calibration system.

A method 200 of operating the calibration system 46 for use with the robotic manipulator 22 is also disclosed herein and shown in FIG. 12. The method 200 comprises moving the measurement instrument 58 within the three-dimensional coordinate system about the end effector 32 (as shown in box 202), interacting the measurement instrument 58 with the reference surface 50 of the adjustable member 36 (as shown in box 204), and transmitting the signal from the measurement instrument 58 to the processor 54 (as shown in box 206). The method further comprises analyzing the location of the measurement instrument 58 within the three-dimensional coordinate system and the interaction between the measurement instrument 58 and the reference surface 50 with the processor 54 (as shown in box 208) and determining the location of the adjustable member 36 within the three-dimensional coordinate system (as shown in box 210).

The robotic manipulator 22 may comprise the plurality of links 26 and joints 30 and may extend to the distal end 28, with the measurement instrument 58 coupled to the distal end 28 of the robotic manipulator 22. Accordingly, moving the measurement instrument 58 within the three-dimensional coordinate system about the end effector 32 (box 202) may be further defined as moving the measurement instrument 58 within the three-dimensional coordinate system about the end effector 32 by moving the plurality of links 26 and joints 30 of the robotic manipulator 22.

The method may further comprise comparing the location to the stored location of the reference surface 50 in the non-transitory computer-readable medium 56 (as shown in box 212) and determining a distance between the location and the stored location in the three-dimensional coordinate system (as shown in box 214). The distance may be translational and/or rotational. The method may further comprise moving to the adjustable member 36 the distance to position the adjustable member 36 in the stored location (as shown in box 216). More specifically, the position of the adjustable member 36 may be corrected by moving the adjustable member 36 to match the stored location. Alternatively, the method may comprise saving the location into the non-transitory computer-readable medium 56 as a stored location (as shown in box 218). More specifically, the location may be saved as the stored location and overwrite the previous stored location or may be a new stored location in an index of stored locations within the non-transitory computer-readable medium 56.

The measurement instrument 58 may comprise the probe 60. Accordingly, interacting the measurement instrument 58 with the reference surface 50 of the adjustable member 36 (box 204) may be further defined as contacting the probe 60 of the measurement instrument 58 with the reference surface 50 of the adjustable member 36. The probe 60, the reference surface 50, the interaction therebetween, and examples thereof are described in detail above.

The measurement instrument 58 may comprise the illumination device 72 and the light sensor 74 and the reference surface 50 may be further defined as the mirror 76, as described above. Accordingly, interacting the measurement instrument 58 with the reference surface 50 of the adjustable member 36 (box 204) may be further defined as emitting light from the illumination device 72 toward the mirror 76 and reflecting the light back to the light sensor 74 with the mirror 76. For example, the adjustable member 36 may further comprise the tube 78 having the bore aligned with the mirror 76. Accordingly, emitting light from the illumination device 72 toward the mirror 76 is further defined as emitting light from the illumination device 72 through the tube 78 and toward the mirror 76 when the light is axially aligned with the bore of the tube 78. Furthermore, the mirror 76 may be further defined as the first mirror 76A and the adjustable member 36 may further comprise the second mirror 76B, with the first and second mirrors 76A, 76B aligned orthogonally. Accordingly, emitting the light from the illumination device 72 toward the mirror 76 and reflecting the light back to the light sensor 74 with the mirror 76 may be further defined as emitting the light from the illumination device 72 toward the first mirror 76A, reflecting the light from the first mirror 76A to the second mirror 76B, and reflecting the light back to the light sensor 74 with the second mirror 76B parallel to the light emitted by the illumination device 72. The illumination device 72, the light sensor 74, the reference surface 50, the interactions therebetween, and examples thereof are described in detail above.

The measurement instrument 58 may comprise the vision system 82. Accordingly, interacting the measurement instrument 58 with the reference surface 50 of the adjustable member 36 (box 204) may be further defined as collecting at least one image of the reference surface 50 with the vision system 82. The vision system 82, the reference surface 50, the interactions therebetween, and examples thereof are described in detail above. Furthermore, analyzing the location of the measurement instrument 58 within the three-dimensional coordinate system and the interaction between the measurement instrument 58 and the reference surface 50 with the processor 54 may be further defined as analyzing the image in comparison to one or more stored images of the reference surface 50 saved within the non-transitory computer-readable medium 56 and identifying differences between the image and the stored images due to differences in the location of the vision system 82 when the image and the stored images were taken.

Accordingly, the calibration system 46 and the corresponding method 200 of operating the calibration system 46 offer several advantages. Determining the location of the adjustable member 36 prevents the robotic manipulator 22 from inadvertently colliding with the end effector 32 when attempting to the adjustable member 36, preventing damage to the adjustable member 36. Furthermore, the calibration system 46 allows the location of the adjustable member 36 to be stored in the non-transitory computer-readable medium 56, correcting deviation in the stored location in the non-transitory computer-readable medium 56. By reducing the possibility of damage from the robotic manipulator, the calibration system 46 promotes the use of the adjustable member 36 with the end effector 32, which is more cost effective to own and operate.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A calibration system for use with a robotic manipulator, the calibration system comprising:
 a docking stand fixed within a three-dimensional coordinate system;
 an end effector configured to be selectively connected to the robotic manipulator, with the end effector supported by the docking stand when disconnected from the robotic manipulator, the end effector comprising:
  a frame received by the docking stand and fixed within the three-dimensional coordinate system; and
  an adjustable member movable along the frame and within the three-dimensional coordinate system, and comprising a clamp in engagement with the frame and configured to selectively fix the adjustable member to the frame, with the adjustable member comprising a first reference surface and a second reference surface separate from the first reference surface;
 a computational system comprising at least one processor and at least one non-transitory computer-readable medium including instructions; and
 a measurement instrument in electronic communication with the computational system, with the measurement instrument movable within the three-dimensional coordinate system about the end effector and arranged to interact with the reference surface and transmit a signal to the processor, with the processor programmed to analyze a location of the measurement instrument within the three-dimensional coordinate system and the interaction between the measurement instrument and the reference surface to determine a location of the adjustable member within the three-dimensional coordinate system, wherein the measurement instrument includes:
a first probe; and
a second probe extending transverse and orthogonal to the first probe, wherein when the measurement instrument is moved in a first direction, the first probe is arranged to contact the first reference surface, and when the measurement instrument is moved in a second direction, the second probe is arranged to contact the second reference surface, and the contact of the first probe with the first reference surface and the second probe with the second reference surface establishes a location within the three-dimensional coordinate system of the measurement instrument relative to the adjustable member.

2. The calibration system as set forth in claim 1 wherein the processor is programmed to compare the location of the adjustable member to a stored location of the first and second reference surfaces in the non-transitory computer-readable medium to determine if the adjustable member is properly positioned relative to the frame.

3. The calibration system as set forth in claim 1 wherein the processor is programmed to save the location into the non-transitory computer-readable medium as a stored location.

4. The calibration system as set forth in claim 1, wherein the first reference surface and the second reference surface are located on the clamp of the adjustable member.

5. The calibration system as set forth in claim 1, wherein the first direction is translation within the three-dimensional coordinate system and the second direction is rotation about the first probe.

6. The calibration system as set forth in claim 1, wherein the frame is comprised of at least one tube, with the clamp configured to surround and compress against the tube to fix the clamp to the tube, and the adjustable member is configured to rotate about and move linearly along the tube.

7. The calibration system as set forth in claim 6, wherein the adjustable member is a suction cup configured to retain a component to the end effector to allow the robotic manipulator to move and manipulate the component.

8. A robotic system comprising:
a robotic manipulator comprising a plurality of links and joints and extending to a distal end;
a calibration system comprising:
a docking stand fixed within a three-dimensional coordinate system;
an end effector configured to be selectively connected to the distal end of the robotic manipulator, with the end effector supported by the docking stand when disconnected from the robotic manipulator, the end effector comprising:
a frame received by the docking stand and fixed within the three-dimensional coordinate system; and
an adjustable member movable along the frame and within the three-dimensional coordinate system, and comprising a clamp in engagement with the frame to selectively fix the adjustable member to the frame, with the adjustable member comprising a reference surface;
a computational system comprising at least one processor and at least one non-transitory computer-readable medium including instructions; and
a measurement instrument in electronic communication with the computational system, with the measurement instrument movable within the three-dimensional coordinate system about the end effector and arranged to interact with the reference surface and transmit a signal to the processor, with the processor programmed to analyze a location of the measurement instrument within the three-dimensional coordinate system and the interaction between the measurement instrument and the reference surface to determine a location of the adjustable member within the three-dimensional coordinate system, wherein the measurement instrument includes:
a first probe; and
a second probe extending transverse and orthogonal to the first probe,
wherein when the measurement instrument is moved in a first direction, the first probe is arranged to contact the first reference surface, and when the measurement instrument is moved in a second direction, the second probe is arranged to contact the second reference surface, and the contact of the first probe with the first reference surface and the second probe with the second reference surface establishes a location within the three-dimensional coordinate system of the measurement instrument relative to the adjustable member.

9. The robotic system of claim 8, wherein the measurement instrument is coupled to the distal end of the robotic manipulator, with the plurality of links and joints arranged to support the measurement instrument and facilitate movement of the measurement instrument within the three-dimensional coordinate system about the end effector.

10. A method comprising:
providing a calibration system comprising:
a docking stand fixed within a three-dimensional coordinate system;
an end effector configured to be selectively connected to a robotic manipulator, with the end effector supported by the docking stand when disconnected from the robotic manipulator, the end effector comprising:
a frame received by the docking stand and fixed within the three-dimensional coordinate system; and
an adjustable member movable along the frame and within the three-dimensional coordinate system, and comprising a clamp in engagement with the frame and configured to selectively fix the adjustable member to the frame, with the adjustable member comprising a first reference surface and a second reference surface separate from the first reference surface;
a computational system comprising at least one processor and at least one non-transitory computer-readable medium including instructions; and
a measurement instrument in electronic communication with the computational system, with the measurement instrument movable within the three-dimensional coordinate system about the end effector and arranged to interact with the reference surface and transmit a signal to the processor, with the processor programmed to analyze a location of the measurement instrument within the three-dimensional coordinate system and the interaction between the measurement instrument and the reference surface to determine a location of the adjustable member within the three-dimensional coordinate system, wherein the measurement instrument includes:
a first probe; and a second probe extending transverse and orthogonal to the first probe,
wherein when the measurement instrument is moved in a first direction, the first probe is arranged to contact the first reference surface, and when the measurement instrument is moved in a second direction, the second probe is arranged to contact the second reference surface, and the contact of the first probe with the first reference surface and the second probe with the second reference surface establishes a location within the three-dimensional coordinate system of the measurement instrument relative to the adjustable member;
moving the measurement instrument within the three-dimensional coordinate system about the end effector;
interacting the measurement instrument with the first and second reference surfaces of the adjustable member;
transmitting a signal from the measurement instrument to the processor;
analyzing a location of the measurement instrument within the three-dimensional coordinate system and the interaction between the measurement instrument and the first and second reference surfaces with the processor; and
determining a location of the adjustable member within the three-dimensional coordinate system.

11. The method of claim 10, further comprising:
comparing the location to a stored location of the first and second reference surfaces in the non-transitory computer-readable medium; and
determining a distance between the location and the stored location in the three-dimensional coordinate system.

12. The method of claim 11, further comprising moving to the adjustable member the distance to position the adjustable member in the stored location.

13. The method of claim 10, further comprising saving the location into the non-transitory computer-readable medium as a stored location.

14. The method of claim 10, wherein the robotic manipulator comprises a plurality of links and joints and extends to a distal end, with the measurement instrument coupled to the distal end of the robotic manipulator, wherein moving the measurement instrument within the three-dimensional coordinate system about the end effector is further defined as moving the measurement instrument within the three-dimensional coordinate system about the end effector by moving the plurality of links and joints of the robotic manipulator.

* * * * *